United States Patent Office 3,369,452
Patented Feb. 20, 1968

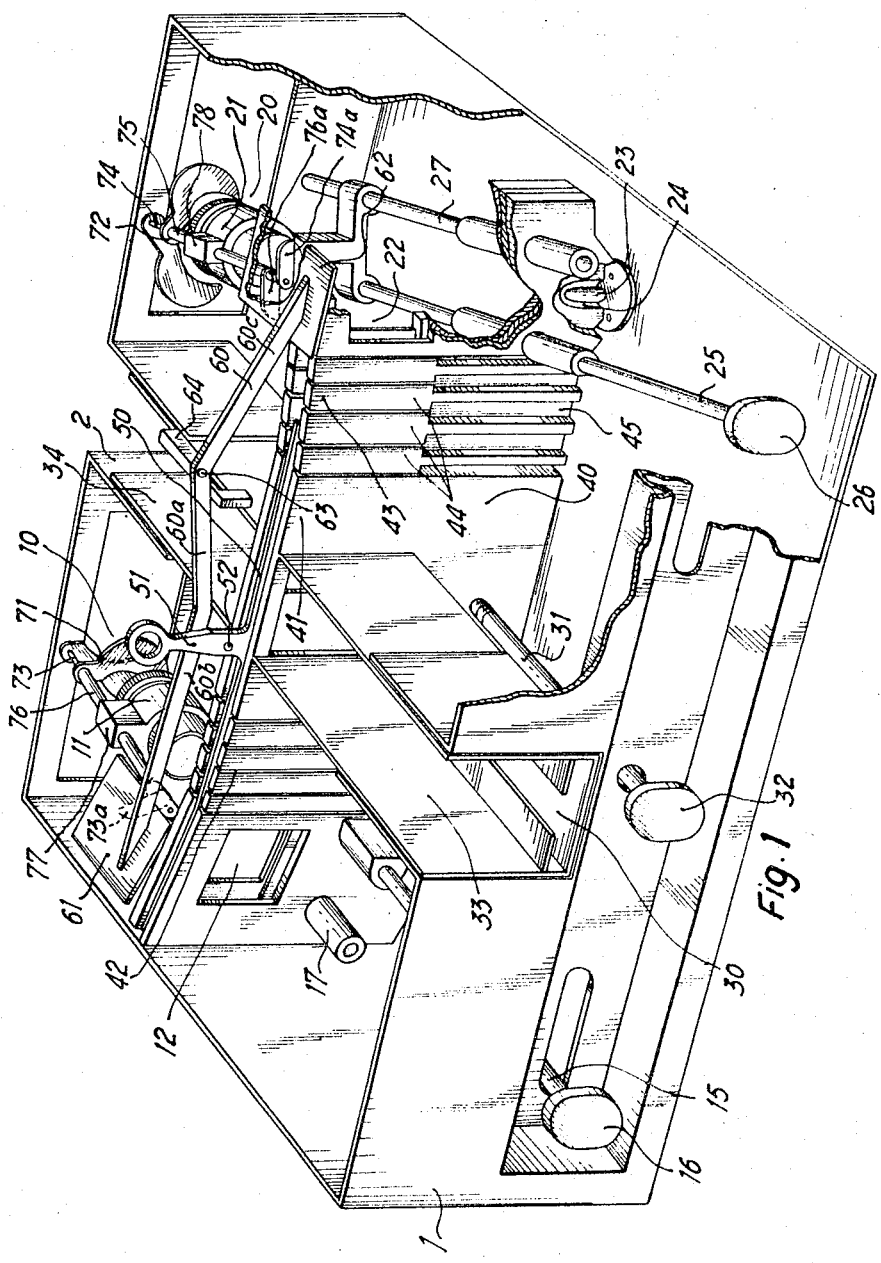

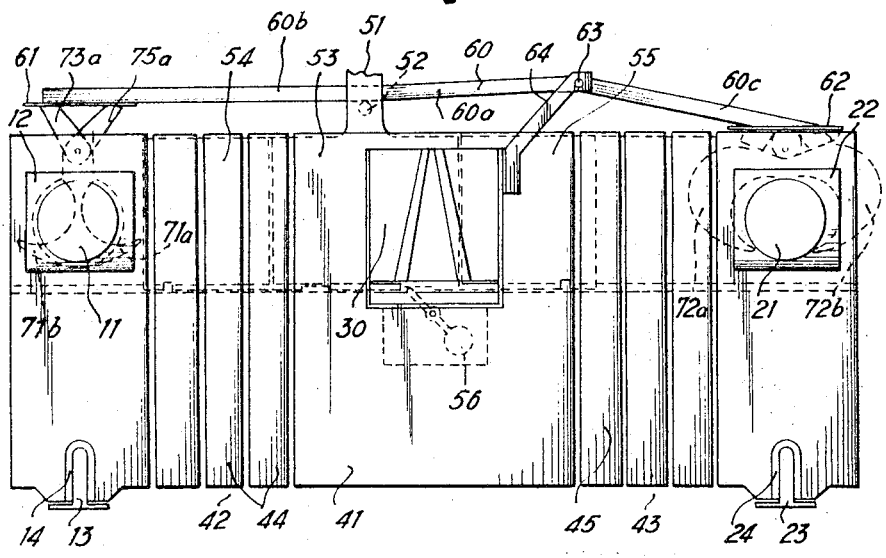
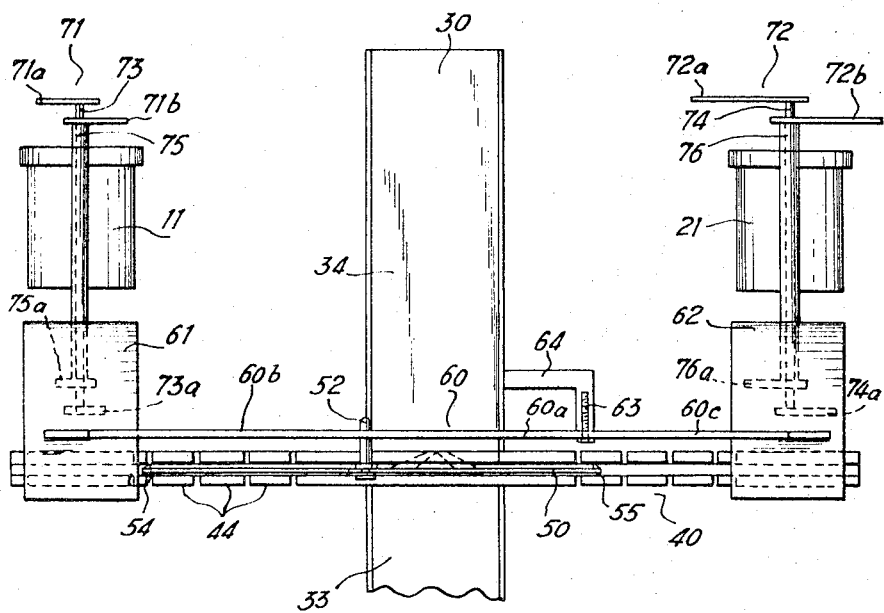

---

3,369,452
PROJECTOR FOR DIAPOSITIVES WITH DOUBLE OPTICAL PROJECTION SYSTEM
Georges Grenier, 95 Rue des Entrepreneurs 15 (Seine), Paris, France
Filed Oct. 20, 1966, Ser. No. 588,021
Claims priority, application France, Oct. 22, 1965, 35,963
4 Claims. (Cl. 88—28)

The present invention relates to a projector for diapositives, comprising a double optical projection system for the purpose of obtaining certain special effects.

Projectors for diapositives are known which comprise two optical projection systems enabling discontinuity to be avoided in the projection of successive views, and, when so required, making it possible to obtain a "wipe mix" effect by projecting gradually two successive views, one over the other, the first fading while the second appears and finally replaces it altogether, a third then progressively appearing, and so on.

The known apparatus comprises a separate feed magazine for each of the projection systems which makes them very awkward to use; in fact, the successive views must be arranged in a clearly-defined order in separate magazines. Furthermore, these apparatus must comprise complicated automatic mechanisms in order to ensure the successive feed of the two optical systems and, when so required, the synchronization of this feed with the control of one or more diaphragms. For all these reasons, these apparatus, which have a very high production cost, have remained very limited in their diffusion.

The present invention has for its object to remedy these drawbacks by means of a projector with a double optical system comprising only a single feed magazine, a single control permitting in a very simple manner the successive supply of diapositives to the two optical systems, while acting in a readily adjustable manner on diaphragms which permit a certain number of special effects to be obtained.

One of the objects of the present invention is the construction of a simple and robust projection apparatus which is easy to use and which enables projection to be made with a wipe-mix effect having a progressiveness and duration which can be varied at the will of the operator.

Another purpose of the present invention is to provide a projection apparatus which permits projection to be effected at will with an effect of relief or a panoramic effect.

Another object of the present invention is to provide a projection apparatus utilizing successively two different optical systems which are supplied by a single magazine in which the diapositives are classified in the exact order in which they will be projected.

All these objects, advantages and other characteristic features of the invention will be better understood from the description which follows below, reference being made to the accompanying drawings, in which:

FIG. 1 is a rear view in perspective with parts broken away of a projection apparatus in accordance with the invention, certain parts not being shown for the sake of improving the clearness of the drawing.

FIG. 2 is a rear view of the diapositive feed system of the apparatus shown in FIG. 1.

FIG. 3 is a partial view in plan of the apparatus shown in FIG. 1.

In FIG. 1 there has been shown a projection apparatus comprising a casing 1 housing the optical systems and the diapositive-feed devices, and the upper cover of which has been removed. Inside this casing 1 are mounted two optical projection units 10 and 20 for the successive or simultaneous projection of diapositives placed in a central magazine 30.

The two optical systems 10 and 20 comprise, in the usual manner, sources of light, parabolic mirrors and a set of condensers. These elements which are known and which do not form part of the present invention, have not been shown in FIG. 1, in which they would normally be located in the rear portion of the casing 1. These systems further comprise projection lenses 11 and 21 respectively, arranged in front of projection windows 12 and 22 respectively.

The two optical systems 10 and 20 are pivotally mounted on the bottom of the casing 1, vertical pivots 13 (not visible in FIG. 1) and 23 fixed on the bottom of the casing 1 co-operating with housings of oval shape 14 (not visible) and 24 provided at the lower parts of the optical systems 10 and 20 under the projection windows 12 and 22. Threaded rods 15 and 25 provided with operating knobs 16 and 26 permit the longitudinal displacement of the projection lenses 11 and 21 with respect to the projection windows 12 and 22 along guiding rods 17 and 27, so as to be able to carry out separately the focussing of the corresponding images on the projection screen.

The central feed magazine 30 is housed in a central channel 2 of the casing 1 and can slide from front to back inside this channel, a threaded rod 31 provided with an operating knob 32 supported on the casing 1 enabling the magazine 30 to be moved forward or backward in the channel 2.

The feed magazine 30 is traversed in its centre by a transverse passage 40 extending from each side and connecting the magazine 30 to the projection windows 12 and 22. The passage 40 separates the magazine 30 into two compartments, a rear compartment 33 and a front compartment 44 respectively. These compartments can be provided with known pressure means, for example of the spring type, for maintaining in position or receiving a variable number of diapositives before or after their projection.

The passage 40 comprises a rigid central portion 41 extending above and below and on each side of the magazine 30 and is extended on each side by two lateral deformable portions 42 and 43 which connect the central part 41 of the passage 40 of the two projection windows 12 and 22 of the optical systems 10 and 20. The deformable lateral portions 42 and 43 are composed of a plurality of vertically-articulated elements 44, so as to permit a certain deformation of the passage 40 when the magazine 30 is displaced axially along the channel 2 by acting on the operating knob 32.

The articulation of the vertical elements 44 is effected by fixing them at their lower part on a single plate of elastically deformable material, for example of steel, crysocal, plastic material or the like. A deformable plate of this kind can be seen in FIG. 2 and has been given the reference 45. As can also be seen in this figure, the length of the plate 45 is equal to the total length of the transverse passage 40 and this plate is pierced with holes for the passage of the focussing control rods 15 and 25 of the lenses 11 and 21.

The articulation of the elements 44 may also be effected by any appropriate means, such as hinges or the like.

A deformable tongue 50 can move in the transverse passage 40 in order to bring the diapositives from the feed magazine 30 towards one or the other of the projection windows 12 or 22 or to carry them back after projection to the other compartment of the magazine 30.

The tongue 50 has an extension at its upper part forming an operating handle 51, on which is fixed a horizontal shaft 52 extending towards the front.

The tongue 50 comprises a central part 53 and two terminal portions 54 and 55 articulated on the central part 53.

In one preferred form of embodiment of the invention, this tongue 50 is composed of a core of flexible material, covered on both faces with a plastic material, for example Teflon. This covering is discontinued on both faces along a vertical line coinciding with the coupling of the central portion and the terminal portions, which enables the terminal portions 54 and 55 to be articulated with respect to the central portion 53.

On their faces which are turned towards the rear, the terminal portions 54 and 55 are provided with abutments, the function of which is to push the diapositives contained in the magazine 30 into the passage 40 towards one projection window or the other. On their faces which are turned towards the front and along their terminal edges, the terminal portions 54 and 55 are provided with at least two lugs in the form of wedges, the inclined portions of which are directed towards the exterior and the flat portion towards the interior. These lugs have the purpose of bringing back a diapositive which has already been projected from the projection window in which it is located into the passage 40 towards the magazine 30.

In the two walls of the passage 40, grooves are formed so as to house springs which compress the diapositives against the tongue 50.

The total length of the tongue 50 will be equal to the distance which separates the internal edges of the projection windows 12 and 22 less a fixed length in order to obtain certain special effects which will be explained later.

At its lower portion, the tongue 50 comprises a certain number of notches co-operating with a reversible pawl 56 provided to prevent any error of operation, for example by withdrawing backwards when the tongue 50 has already engaged a diapositive in the passage 40.

On the top of the projector and in front of the transverse passage 40 is arranged a balance comprising a beam 60 provided at its two extremities with trays 61 and 62. The beam 60 is pivotally mounted on a horizontal shaft 63 carried by a support 64 fixed on the feed magazine 30. The shaft 63 is displaced with respect to the plane of symmetry of the projector, for example towards the right-hand side, as can be seen in FIG. 1. This off-centering of the pivotal axis of the beam 60 defines two arms of unequal length. The longest arm which carries the tray 61, comprises a first part 60a inclined downwards from the pivot 63 and being extended towards the tray 61 by a normally horizontal portion 60b. The shorter arm 60c comprises solely a downwardly-inclined portion which couples the pivot 63 to the tray 62.

The horizontal shaft 52 of the operating handle 51 of the tongue 50 is arranged so is to co-operate with the lower surface of the horizontal portion 60b of the balance-beam 60. When this shaft 52 is located in the zone which separates the tray 62 from the lower extremity of the horizontal portion 60b, it is not in contact with the lower surface of the beam 60 and this latter, under the effect of gravity, tilts towards the left and the left-hand tray 61 occupies its bottom position.

When by displacing the handle 51 towards the left, the shaft 52 comes in contact with the portion 60b, it causes an upward movement of the left-hand arm of the beam 60, which has the effect of lifting the tray 61 and lowering the tray 62. This position will be reached gradually during a period of time which can be adjusted at the will of the operator, by moving the shaft 52 more or less rapidly under the portion 60b of the beam 60.

Diaphragms 71 and 72 of the total closure type are arranged in front of the projection lenses 11 and 21 respectively. These diaphragms are constituted by two crescent-shaped blades 71a, and 72a, 72b. The blades 71a and 72a are mounted on horizontal shafts 73 and 74 respectively, mounted inside hollow shafts 75 and 76, on the front extremities of which are fixed the two other diaphragm springs, 71b and 72b respectively.

At their rear extremities, the various shafts 73, 75 and 74, 76 carry cams 73a, 75a, and 74a, 76a, rigidly fixed on their respective shafts. These cams are located underneath the above-mentioned trays, the cams 73a and 75a coming under the tray 61, and the cams 74a and 76a coming underneath the tray 62. The arrangement of the cams on their shafts is such that the corresponding diaphragm is open when the tray presses on the cams, the diaphragm blades re-closing by gravity when the corresponding tray does not act on the cams.

The diaphragms 71 and 72 are held in position by means of blocks 77 and 78 fixed on the lenses 11 and 21, and in which the hollow shafts 75 and 76 are engaged.

The operation of the apparatus will be described below. In order to carry out a projection of diapositives with a wipe-mix effect, the rear portion 44 of the magazine 30 will first be fed with diapositives and the two optical systems 10 and 20 will be moved into convergence by screwing the operating knob 32, which has the effect of causing the magazine 30 to slide towards the rear and of pivoting into convergence the systems 10 and 20 on their respective pivots 13 and 23. The adjustment is obtained when the images of the projection windows 12 and 22 coincide perfectly on the projection screen. It should be observed that the convergence of the two optical systems is made possible by the deformable nature of the transverse passage 40.

It will be assumed that the two projection windows 12 and 22 have previously been supplied with diapositives, and that the tongue 50 is actuated from the right towards the left. The tongue 50 thus deposits a diapositive in the window 22 and, by means of the lugs which it carries on its front face, it has again taken-up the diapositive which has just been projected. Continuing its movement towards the left, the portion 55 of the tongue 50 will reach the central magazine 30, in the front compartment 34 of which it will deposit the diapositive which has already been projected, while, by means of the abutment which it carries on its rear face, the portion 54 has already extracted a diapositive to be projected from the rear compartment 33 of the magazine 30.

It should be observed that as long as the shaft 52 has not reached the horizontal portion 60b of the balance-beam 60, the tray 61 occupies its bottom position and the projection is thus effected by the left-hand optical system 10, the diaphragm of which is wide open.

When the shaft 52 comes level with the lower portion 60b, the tray 61 will move-up gradually while the tray 62 will move downwards. The result is that the image of the view placed in the window 12 will "fade-out" progressively, while the image of the view placed in the window 22 will "fade-in" or appear progressively on the projection screen.

When the diapositive pushed by the portion 54 of the tongue 50 passes into the window 12, the diaphragm 71 of the lens 11 is totally closed, which enables this new diapositive to be placed in position and projected while that which has just been projected is taken-up again as has been described above.

The handle 51 will then be brought back from the left towards the right, the portion 55 of the tongue 50 extracting, by means of its rear face, a fresh diapositive from the magazine 33 and brings it towards the window 22, while the portion 54, by its front face, takes back the diapositive which has just been projected through the window 12 towards the magazine 33. During this movement from left to right, the tray 61 will move downwards progressively while the shaft 52 leaves the horizontal portion 60b of the balance-beam 60 and while the tray 62 moves upwards gradually. This results in the progressive disappearance of the view which was projected by the right-hand optical system 20, and the simultaneous progressive appearance of the view previously placed in the window 12.

Projection with an effect of relief will be obtained by projecting two identical superimposed views and mounting crossed polarizing filters in front of the lenses, the spectator being provided with spectacles fitted with lenses polarized in the opposite direction.

Projection with a panoramic effect will be obtained by causing the optical axes of the two systems 10 and 20 to diverge by unscrewing the operating knob 32 in such manner that the respective images of the projection windows 12 and 22 are juxtaposed on the projection screen.

It will of course be understood that the present invention is not restricted to the form of construction which has just been described solely by way of example, and that numerous modifications can be made thereto without thereby departing from the scope of the present invention.

Thus, in particular, the control of the diaphragms may be effected by any appropriate mechanical device. It may also be envisaged to replace the total-closure diaphragms by rheostats acting on the light intensity of the projection lamps, these rheostats being actuated by the displacement of the feed tongue.

What I claim is:

1. A projection apparatus for disapositives, comprising, in combination:
   (a) a casing,
   (b) a first and a second optical system, each comprising a source of light, means for concentrating the rays coming from said source of light, a projection lens and at least one total-closure diaphragm, said optical systems being pivotally mounted on said casing so as to be able to modify their respective angular position,
   (c) a magazine for receiving said diapositives arranged between said optical systems, said magazine being axially movable from front to rear with respect to said casing,
   (d) a first and a second projection window interposed between said sources of light and said respective lenses,
   (e) two deformable passage elements arranged transversely on each side of the centre of said magazine, said passages coupling said magazine to said projection windows,
   (f) a flexible tongue adapted to be displaced transversely inside the passage elements between said projection windows and said magazine, said tongue comprising means for controlling the opening and closure of said diaphragms simultaneously with the supply of diapositives to and recovery of diapositives from said projection windows.

2. A projection apparatus for diapositives, comprising, in combination:
   (a) a casing,
   (b) a first and a second optical system, each comprising a source of light, means for concentrating the rays coming from said source of light, a projection lens and at least one total-closure diaphragm, said optical systems being pivotally mounted on said casing so as to be able to modify their respective angular position,
   (c) a magazine for diapositives arranged between said optical systems, said magazine comprising a front compartment and a rear compartment, a threaded rod supported on said casing permitting the axial displacement of said magazine,
   (d) a first and a second projection window interposed between said sources of light and said respective lenses,
   (e) two deformable passage elements arranged transversley on each side of said magazine and communicating with the two compartments of said magazine, said passage elements coupling said compartments to said projection windows, said passage elements being composed of a plurality of vertical portions articulated on each other,
   (f) a flexible tongue adapted to be displaced transversely inside the passage elements between said projection windows and said magazine, said tongue comprising means for controlling the opening and closure of said diaphragms simultaneously with the supply of diapositives to and recovery of diapositives from said projection windows.

3. A projection apparatus for diapositives, comprising, in combination:
   (a) a casing,
   (b) a first and a second optical system, each comprising a source of light, means for concentrating the rays coming from said source of light, a projection lens, and at least one total-closure diaphragm arranged in front of said lens and constituted by two pivoted blades mounted on horizontal shafts rigidly fixed to said lens, said optical systems comprising at their lower portions, housings of oval shape adapted to cooperate with horizontal shafts rigidly fixed to said casing,
   (c) a magazine for receiving said diapositives arranged between said optical systems, said magazine being axially displaceable from front to rear with respect to said casing,
   (d) a first and a second projection window interposed between said sources of light and said respective lenses,
   (e) two deformable passage elements arranged transversely on each side of the centre of said magazine, said passages coupling said magazine to said projection windows,
   (f) a flexible tongue adapted to be transversely displaced in the interior of the passage elements between said projection windows and said magazine, said tongue comprising means for controlling the opening and closure of said diaphragms simultaneously with the supply of diapositives to and the recovery of diapositives from said projection windows.

4. Apparatus for projection of diapositives, comprising, in combination:
   (a) a casing,
   (b) a first and a second optical system each comprising a source of light, means for concentrating the rays coming from said source of light, a projection lens, and at least one total-closure diaphragm arranged in front of said lens and constituted by two pivoted blades mounted on horizontal shafts rigidly fixed to said lens, said optical systems comprising at their lower portions, housings of oval shape adapted to cooperate with the horizontal shafts rigidly fixed to said casing,
   (c) a magazine for diapositives arranged between said optical systems, said magazine comprising a front compartment and a rear compartment, a threaded rod supported on said casing and permitting the axial displacement of said magazine,
   (d) a first and a second projection window interposed between said sources of light and said respective lenses,
   (e) two deformable passage elements arranged transversely on each side of said magazine and communicating with the two compartments of said magazine, said passage elements coupling said compartments to said projection windows, the passage elements being constituted by a plurality of vertical portions articulated on each other,
   (f) a flexible tongue comprising a central portion and two terminal portions articulated with respect to said central portion and comprising a horizontal shaft, said tongue comprising an abutment on each of the rear faces of said terminal portions and wedge-shaped lugs on the front face of each of said terminal portions,
(g) a balance comprising a beam and two trays, said trays acting on cams rigidly fixed to said horizontal shafts carrying said pivoted blades of said total-closure diaphragms.

References Cited

UNITED STATES PATENTS 3,093,030  6/1963  Carrillo _____ 88—28

NORTON ANSHER, *Primary Examiner.*

J. W. PRICE, *Assistant Examiner.*